United States Patent [19]
Akagawa et al.

[11] Patent Number: 5,953,154
[45] Date of Patent: Sep. 14, 1999

[54] OPTICALLY PARAMETRIC OSCILLATOR AND WAVELENGTH-TUNABLE LASER SYSTEM

[75] Inventors: Kazuyuki Akagawa; Satoshi Wada; Hideo Tashiro, all of Sendai, Japan

[73] Assignee: Rikagaku Kenkyusho, Saitama, Japan

[21] Appl. No.: 08/848,621

[22] Filed: Apr. 29, 1997

[30] Foreign Application Priority Data

Apr. 30, 1996 [JP] Japan ................................ 8-132848

[51] Int. Cl.$^6$ .............................. G02F 1/39; H01S 3/108
[52] U.S. Cl. .............................................. 359/330; 372/21
[58] Field of Search ................................ 372/13, 21, 22; 359/326–332

[56] References Cited

U.S. PATENT DOCUMENTS

| | | | |
|---|---|---|---|
| 3,700,912 | 10/1972 | Glass et al. | 359/328 |
| 3,947,780 | 3/1976 | Rice | 372/22 X |
| 4,250,466 | 2/1981 | Jernigan et al. | 372/26 |
| 5,384,799 | 1/1995 | Osterwalder | 372/21 X |

OTHER PUBLICATIONS

"Electronic Tuning of a Dye Laser Using the Acousto–Optic Filter" by D.J. Taylor et al., *Applied Physics Letters*, vol. 19, No. 8, pp. 269–271, Oct. 15, 1971.

"Widely Tunable 90° Phase–Matched KTP Parametric Osillator" by K. Kato et al., *Optics Letters*, vol. 17, No. 3, pp. 178–179, Feb. 1, 1992.

Zenzie H. H., et al., "Tunable Optical Parametric Oscillators Pumped By Ti:Sapphire Lasers" *Optics Letters*, Jul. 1, 1994, USA, vol. 19, No. 13, ISSN 0146–9592, pp. 963–965, XP002047396.

Labert J.L., "Acousto–Optical Filter Can Rapidly Tune Solid–State Lasers", *NTIS Tech Notes*, Oct. 1, 1991, p. 780 XP000267001.

Schweicher E., et al., "Acousto–Optical Signal Processing and Integrated Optics" *Revue HF*, 1988, Belgium, vol. 14, No. 3–4, ISSN 0035–3248, pp. 88–122, XP000111402, section 2.10. [No Month].

Akagawa, K., et al., "High–Speed Optical Parametric Oscillator Pumped With an Electronically Tuned Ti: Sapphire Laser", *Applied Physics Letters*, Mar. 10, 1997, AIP, USA, vol. 70, No. 10, ISSN 0003–6951, pp. 1213–1215, XP000685279.

Wada S., et al., "Electronically Tuned Ti: Sapphire Laser" *Optics Letters*, May 15, 1996, Opt. Soc. America, USA, vol. 21, No. 10, ISSN, ISSN 0146–9592, pp. 731–733, XP000589954.

Isaenko Yu Zh et al., Sov. J. Quantum Electron, 18(10), Oct. 1988 (USSR), pp. 1258–1259.

*Primary Examiner*—John D. Lee

[57] ABSTRACT

An object of the present invention is to speed up a wavelength tuning speed thereby varying both wavelengths of signal light and idler light at high speed. The optically parametric oscillator according to the present invention wherein a resonator is composed of an output coupling mirror having a prescribed transmittivity and a total reflection mirror, a nonlinear crystal is disposed in the resonator, the outgoing laser beam outputted from the laser oscillator is inputted into the resonator as excitation light to excite the nonlinear crystal, whereby both signal light and idler light having a wavelength in response to the wavelength of the excitation light, respectively, are outputted, characterized by a laser resonator composed of opposed mirrors each having a prescribed reflectivity, a wavelength tunable laser medium disposed in the laser resonator and capable of laser oscillation in the wavelength zone within a prescribed range, an acousto-optical crystal disposed in the laser resonator and to which is inputted the outgoing light from the wavelength tunable laser medium, and an acoustic wave inputting means mounted to the acousto-optical crystal and for inputting acoustic wave to the acousto-optical crystal.

16 Claims, 16 Drawing Sheets

SIGNAL···OUTGOING SIGNAL LIGHT
IDLER···OUTGOING IDLER LIGHT

OPTICALLY PARAMETRIC OSCILLATOR AND WAVELENGTH-TUNABLE LASER SYSTEM

BACKGROUND OF THE INVENTION

1. Field of the Invention

The present invention relates to an optically parametric oscillator, and more particularly to an optically parametric oscillator wherein wavelengths of signal light and idler light are allowed to vary by changing the wavelength of excitation light.

2. Description of the Related Art

In general, an optically parametric oscillator of an excitation wavelength tunable type wherein a resonator is composed of an output coupling mirror having a prescribed transmittivity and a total reflection mirror, a nonlinear crystal is disposed in the resonator, excitation light is inputted into the resonator to excite the nonlinear crystal, whereby signal light and idler light both of which have wavelengths in response to a wavelength of the excitation light, respectively, are outputted has been known.

In such an optically parametric oscillator as described above, a position for providing the nonlinear crystal has been fixed and when a wavelength of the excitation light is varied, the signal light and the idler light having a desired wavelength, respectively, are obtained.

In this respect, as an excitation light source for generating excitation light having an arbitrary wavelength, wavelength tunable laser is usually employed. As the wavelength tunable laser, a solid laser wherein a crystal such as Ti:Al$_2$O$_3$ (titanium sapphire) and the like is used as the laser medium, and a liquid laser wherein a dye solution or the like is used as the laser medium have been widely employed.

Heretofore, as a manner for selecting wavelength for the sake of producing laser oscillation, there is, for example, such an arrangement that a diffraction grating, birefringent plate or the like is disposed in a laser resonator containing a wavelength tunable laser medium, such a diffraction grating, birefringent plate or the like is mechanically rotated, whereby only the outgoing light having a desired wavelength is taken out from among the outgoing light rays outputted from the wavelength tunable laser, the outgoing light thus taken out reflects with respect to the wavelength tunable laser to amplify the same thereby producing laser oscillation, so that only the laser beam having a desired wavelength is outputted from the laser resonator.

However, such a conventional manner for selecting wavelength as described above involves such a problem that since a diffraction grating, birefringent plate or the like is mechanically rotated in this manner, it is difficult to speed up a wavelength tuning speed of the laser beam outputted as excitation light, so that both wavelengths of signal light and idler light cannot be varied at high speed.

OBJECT AND SUMMARY OF THE INVENTION

The present invention has been made in view of the problem as described above involved in the prior art. Accordingly, an object of the present invention is to provide an optically parametric oscillator by which a wavelength tuning speed of excitation light can be sped up, and wavelengths of signal light and idler light can be varied at high speed.

For the sake of attaining the above described object, the optically parametric oscillator according to the present invention wherein a resonator is composed of an output coupling mirror having a prescribed transmittivity and a total reflection mirror, a nonlinear crystal is disposed in the aforesaid resonator, the outgoing laser beam outputted from the laser oscillator is inputted into the aforesaid resonator as excitation light to excite the aforesaid nonlinear crystal, whereby both signal light and idler light having a wavelength in response to the wavelength of the aforesaid excitation light, respectively, are outputted, characterized by a laser resonator composed of opposed mirrors each having a prescribed reflectivity, a wavelength tunable laser medium disposed in the aforesaid laser resonator and capable of laser oscillation in the wavelength zone within a prescribed range, an acousto-optical crystal disposed in the aforesaid laser resonator and to which is inputted the outgoing light from the aforesaid wavelength tunable laser medium, and an acoustic wave inputting means mounted to the aforesaid acousto-optical crystal and for inputting acoustic wave to the aforesaid acousto-optical crystal.

Furthermore, the optically parametric oscillator according to the present invention wherein a resonator is composed of an output coupling mirror having a prescribed transmittivity and a total reflection mirror, a nonlinear crystal is disposed in the aforesaid resonator, the outgoing laser beam outputted from the laser oscillator is inputted into the aforesaid resonator as excitation light to excite the aforesaid nonlinear crystal, whereby both signal light and idler light having a wavelength in response to the wavelength of the aforesaid excitation light, respectively, are outputted, characterized by a laser resonator composed of opposed mirrors each having a prescribed reflectivity, a wavelength tunable laser medium disposed in the aforesaid laser resonator and capable of laser oscillation in the wavelength zone within a prescribed range, an acousto-optical crystal disposed in the aforesaid laser resonator and to which is inputted the outgoing light from the aforesaid wavelength tunable laser medium, an acoustic wave inputting means mounted to the aforesaid acousto-optical crystal and for inputting acoustic wave to the aforesaid acousto-optical crystal, and an optical element disposed in the aforesaid laser oscillator and for correcting dispersion of the diffracted light outputted from the aforesaid acousto-optical crystal.

Moreover, the optically parametric oscillator according to the present invention may be further provided with an expanding means disposed in the aforesaid laser resonator involved in the aforesaid laser oscillator and for expanding a beam diameter of the light outputted from the aforesaid wavelength tunable laser medium which is to be inputted to the aforesaid acousto-optical crystal.

Thus, in the optically parametric oscillator according to the present invention, since wavelength selection of the outgoing laser beam being excitation light which is outputted from the laser oscillator can be realized by inputting an acoustic wave to the acousto-optical crystal by the acoustic wave inputting means, wavelength tuning in case of laser oscillation becomes possible to conduct at high speed, whereby high-speed and random wavelength selection of the excitation light being the outgoing laser beam becomes possible. As a result, it is possible to speed up a wavelength tuning speed of the excitation light being the outgoing laser beam. Therefore, it becomes possible to vary both the wavelengths of outgoing signal light and outgoing idler light at high speed in response to increased wavelength tuning speed of the excitation light.

Wavelength selecting action for the outgoing laser beam being excitation light outputted from the laser oscillator will be described in detail herein. The selection of wavelength has been applied as a result of paying its attention to the fact that when an acoustic wave is allowed to generate in an acousto-optical crystal having birefringent property such as $TeO_2$ crystal and the like, the polarizing plane of diffracted light having a specified wavelength in response to a frequency of the aforesaid acoustic wave among the light rays inputted to the aforesaid crystal becomes orthogonal to the polarizing plane of non-diffracted light, besides an outgoing angle of the aforesaid difracted light declines with respect to an outgoing angle of the non-diffracted light so as to differ remarkably therefrom.

FIG. 1 is a conceptual diagram illustrating a wavelength selecting action utilizing a polarizing action of light 102 having a specified wavelength by means of acoustic wave wherein incident light having wavelength λ i and angular frequency ω i is inputted to an acousto-optical crystal 100 having birefringent property. In this case, when acoustic wave 104 having frequency ω a is applied into the acousto-optical crystal 100, diffracted light 106 is obtained.

With respect to the diffracted light 106 which is a light ray component diffracted in the above described acousto-optical crystal 100, when a total reflection mirror 110 and a mirror having a prescribed transmittivity on the outgoing side 112 are disposed, a laser resonator in which the diffracted light reciprocates between the total reflection mirror 110 and the mirror on the outgoing side 112 of them is constituted.

In this case, a wavelength of the diffracted light 106 is determined by a frequency of the acoustic wave 104 generated in the acousto-optical crystal 100. Accordingly, in, for example, such an arrangement that a piezoelectric element driven by an RF power source is attached to the acousto-optical crystal 100, and the piezoelectric element is driven by the RF power source to cause strain in this piezoelectric element, whereby the acoustic wave 104 having a frequency in response to the strain is inputted to the acousto-optical crystal 100, so that variable control of laser wavelength becomes possible by controlling the frequency of the RF power source.

On the other hand, a diffraction efficiency to the diffracted light 106 is determined by the intensity of acoustic wave, so that when input power of the RF power source is controlled, it becomes possible to control loss of the laser resonator, and further to control variably the laser output.

However, since a diffraction angle α 109 is not perfectly constant with respect to a wavelength of the diffracted light, a range of wavelengths within which a laser resonator can be constituted is narrow due to vertical reflection of the total reflection mirror 110 with respect to the diffracted light 106. Thus, an angle in disposing the total reflection mirror 110 must be adjusted little by little for an oscillating laser within a wide region, so that there is a concern that the adjusting operation therefore becomes complicated from practical point of view. For this reason, it is necessary for correcting deflections of the diffraction angle α 109 by any means to widen the range of variable wavelength without changing the angle of the total reflection mirror 110 disposed.

For correcting the deflections of the diffraction angle α 109, for example, there is the technique diclosed herein wherein an optical element which disperses wavelength of light such as a triangular prism or the like may be employed to set the same in such that light rays having a deflection angle Δα defined by wavelengths λ1 and λ2 advance substantially parallelly after passing through the triangular prism. As a result, it becomes possible to always vertically input the diffracted light 106 with respect to the total reflection mirror 110, whereby a laser resonator used for a wide wavelength zone can be constituted.

Furthermore, in the case where there is such a concern that output power of laser rises so that the acousto-optical crystal 100 in the laser resonator is optically damaged (for example, when $TeO_2$ crystal is used as the acousto-optical crystal 100, it is easily damaged, because a crystal damaging threshold value of $TeO_2$ crystal is smaller than those of the laser crystal and other optical parts), a possibility of damaging the acousto-optical crystal 100 can be reduced by placing in the laser resonator an expanding means such as a beam simple microscope etc. like a telescope for expanding a beam diameter of the light inputted to the acousto-optical crystal 100.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

The optically parametric oscillator according to the present invention will be described in detail hereinafter by referring to the accompanying drawings.

Figure 1:
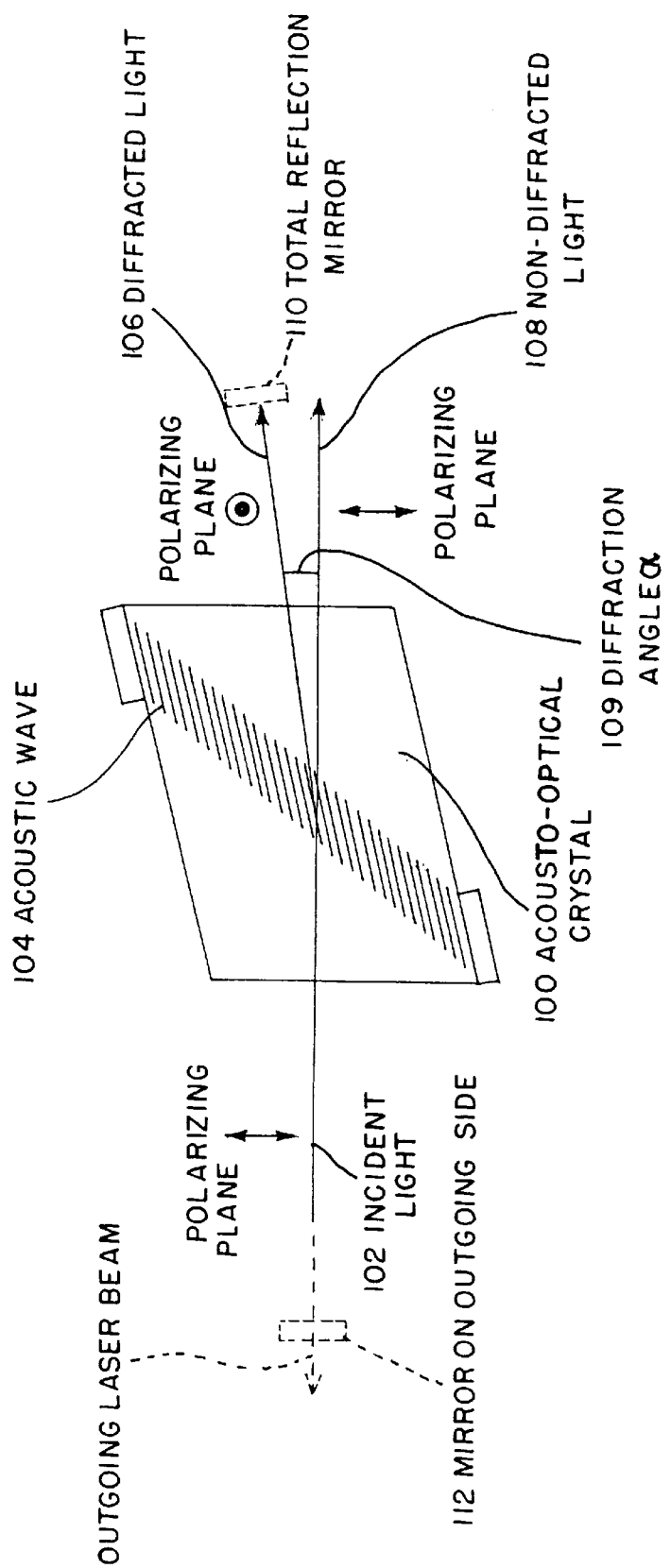
FIG. 1 is a conceptual diagram illustrating a wavelength selecting action utilizing a diffraction function of light having a specified wavelength due to acoustic wave.
Figure 2:
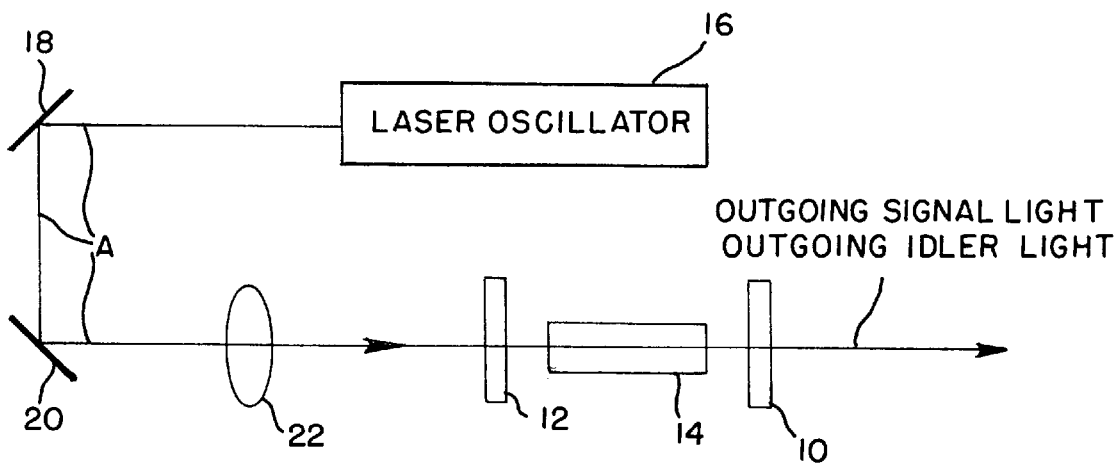
FIG. 2 is a schematic constitutional diagram for explaining a manner of practice of the optically parametric oscillator according to the present invention.

FIG. 2 is a schematic constitutional diagram for explaining a manner of practicing the optically parametric oscillator according to the present invention. In this optically parametric oscillator, a resonator is composed of a mirror having a prescribed transmittivity on the outgoing side 10 and a total reflection mirror 12, and inside this resonator, a KTP crystal 14 is placed as a nonlinear crystal.

Reference numeral 16 designates a laser oscillator, as an excitation light source, which can select electrically a wavelength. Excitation light A being the laser beam outputted from the laser oscillator 16 is reflected by total reflection mirrors 18 and 20 to be inputted to a converging lens 22, and then inputted to the resonator after being collected by the converging lens 22.

Figure 3:
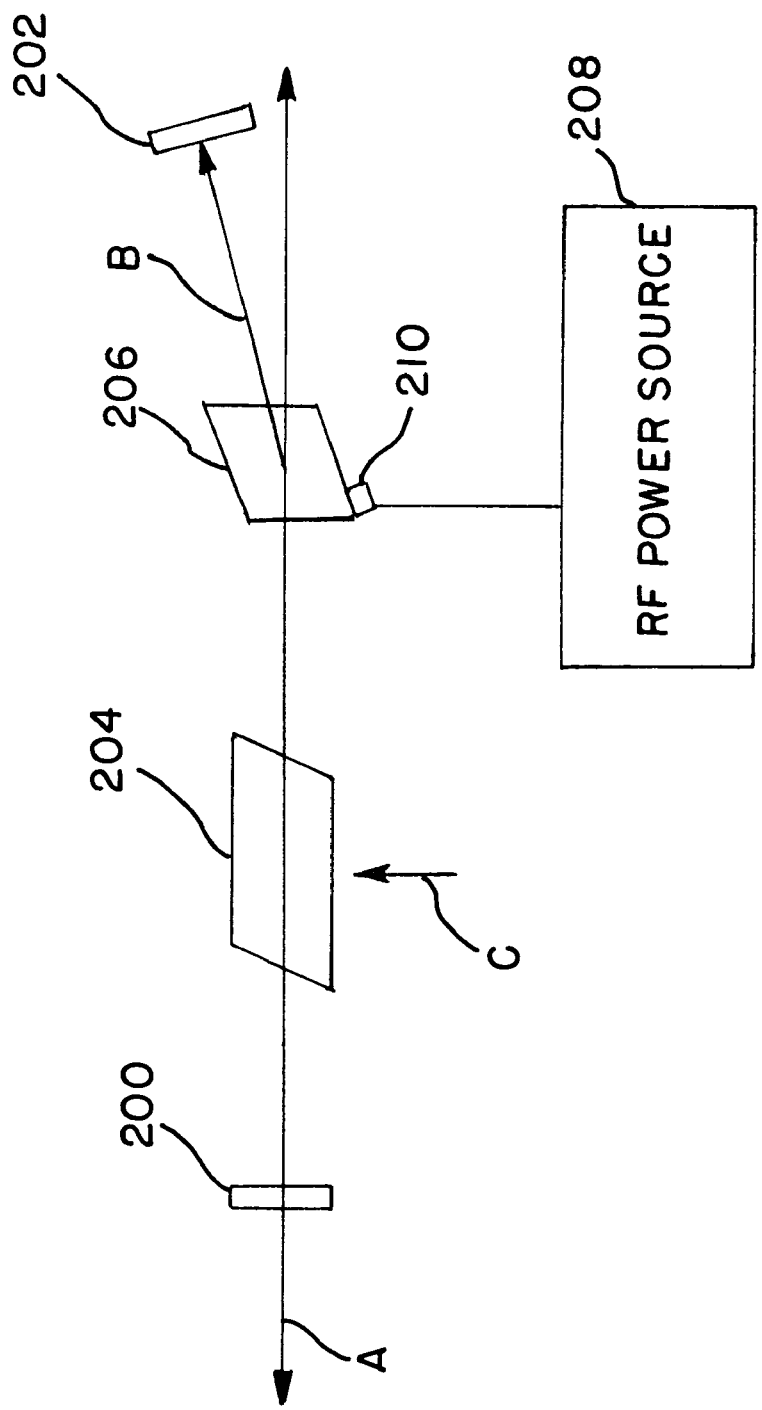
FIG. 3 is a schematic constitutional diagram for explaining the first constitution of a laser oscillator.

FIG. 3 shows a constitution of the laser oscillator 16 wherein a laser resonator is composed of a mirror having a prescribed transmittivity on the outgoing side 200 and a total reflection mirror 202.

Inside the laser resonator, a Ti:Al$_2$O$_3$ laser crystal 204 as a wavelength tunable laser, and an acousto-optical crystal 206 having birefringent property are disposed in this order from the mirror on the outgoing side 200 to the total reflection mirror 202.

Further, to the acousto-optical crystal 206 is attached a piezoelectric element 210, as a means for inputting acoustic wave, which is driven by an RF power source 208. Accordingly, when the piezoelectric element 210 is driven by the RF power source 208 to cause strain in the piezoelectric element 210, the acoustic wave having a frequency in response to the aforesaid strain derived from the piezoelectric element 210 is inputted to the acousto-optical crystal 206.

On one hand, the total reflection mirror 202 is constituted in such that it reflects only the diffracted light B diffracted by the acousto-optical crystal 206 in a prescribed direction.

The piezoelectric element 210 is arranged in such that acoustic wave is inputted to the acousto-optical crystal 206 so as to diffract only the light having a wavelength of the outgoing laser beam which is intended to output as the excitation light A.

Moreover, Ti:Al$_2$O$_3$ laser crystal 204 is arranged in such that excitation laser beam C for exciting the Ti:Al$_2$O$_3$ laser crystal 204 is inputted thereto.

In the above described arrangements, when the KTP crystal 14 is excited by the excitation light A outputted from the laser oscillator 16, light having two types of wavelengths, i.e., the one of signal light and the other of idler light wherein both the wavelengths respond to the excitation light A, respectively, is outputted.

The signal light and the idler light having each of these two types of wavelengths reciprocate in the resonator composed of the mirror on the outgoing side 10 and the total reflection mirror 12 to be amplified, thereby producing oscillation, so that outgoing signal light and outgoing idler light are outputted from the mirror on the outgoing side 10.

In this case, when a wavelength of the excitation light A is varied, the outgoing signal light and the outgoing idler light each having a desired wavelength can be outputted.

Output of the excitation light A from the laser oscillator 16 will be described herein. First, Ti:Al$_2$O$_3$ laser crystal 204 is excited by utilizing the second harmonics of Nd:YAG laser as the excitation laser beam C. Moreover, based on the above described principle, a frequency of the RF power source 208 is controlled to drive the piezoelectric element 210 in response to a wavelength of the outgoing laser beam which is desired to output as the excitation light A from the mirror on the outgoing side 200.

In the situation described above, with respect to the outgoing light having a wavelength in response to the frequency of the RF power source 208 among the outgoing light rays outputted from the Ti:Al$_2$O$_3$ laser crystal 204, the light being derived from the one which was inputted to the acousto-optical crystal 206 and which belongs to a wide range of wavelength zone, the light is diffracted in a prescribed direction to be outputted from the acousto-optical crystal 206 as the diffracted light B. Thus, only the diffracted light B outputted from the acousto-optical crystal 206 in a diffracted state along a prescribed direction is reflected by the total reflection mirror 202, whereby the resulting light reciprocates inside the laser resonator.

As a result, only the light having a wavelength in response to a frequency of the RF power source 208 is amplified to generate laser oscillation, whereby only the outgoing laser beam having the aforesaid wavelength can be outputted as the excitation light A.

As described above, selection for the wavelength of the excitation light A being the outgoing laser beam from the laser oscillator 16 can be realized by selecting a frequency of the RF power source 208 to oscillate the piezoelectric element 210 by means of the RF power source 208, so that tuning of frequency in case of laser oscillation can be effected at high speed, whereby high-speed and random wavelength selection of the excitation light A being the outgoing laser beam becomes possible. As a result, it is possible to increase a wavelength tuning speed of the excitation light A being the outgoing laser beam. In response to increased wavelength tuning speed of the excitation light, wavelengths of the outgoing signal light and the outgoing idler light become to be variable at high speed.

Results of an experiment which was conducted by utilizing the optically parametric oscillator shown in FIGS. 2 and 3 in accordance with the following experimental condition will be described hereunder.

(Experimental Conditions)

Excitation light A: Pulse laser beam of 706 nm to 948 nm wavelength, 4 mJ/pulse maximum energy, and 20 ns to 40 ns pulse width Mirror on the outgoing side 10:90% reflection at a wavelength of signal light Total reflection mirror 12:99.9% reflection at a wavelength of signal light FIG. 4 is a graphical representation showing each relationship between a wavelength of the excitation light A and wavelengths of the outgoing signal light and the outgoing idler light, FIG. 5 is a graphical representation showing each relationship between a wavelength of the excitation light A and output of the outgoing signal light and that of the outgoing idler light, and FIG. 6 is a graphical representation showing each relationship between wavelengths of the outgoing signal light as well as of the outgoing idler light and output of the outgoing signal light as well as of the outgoing idler light.

Figure 4:
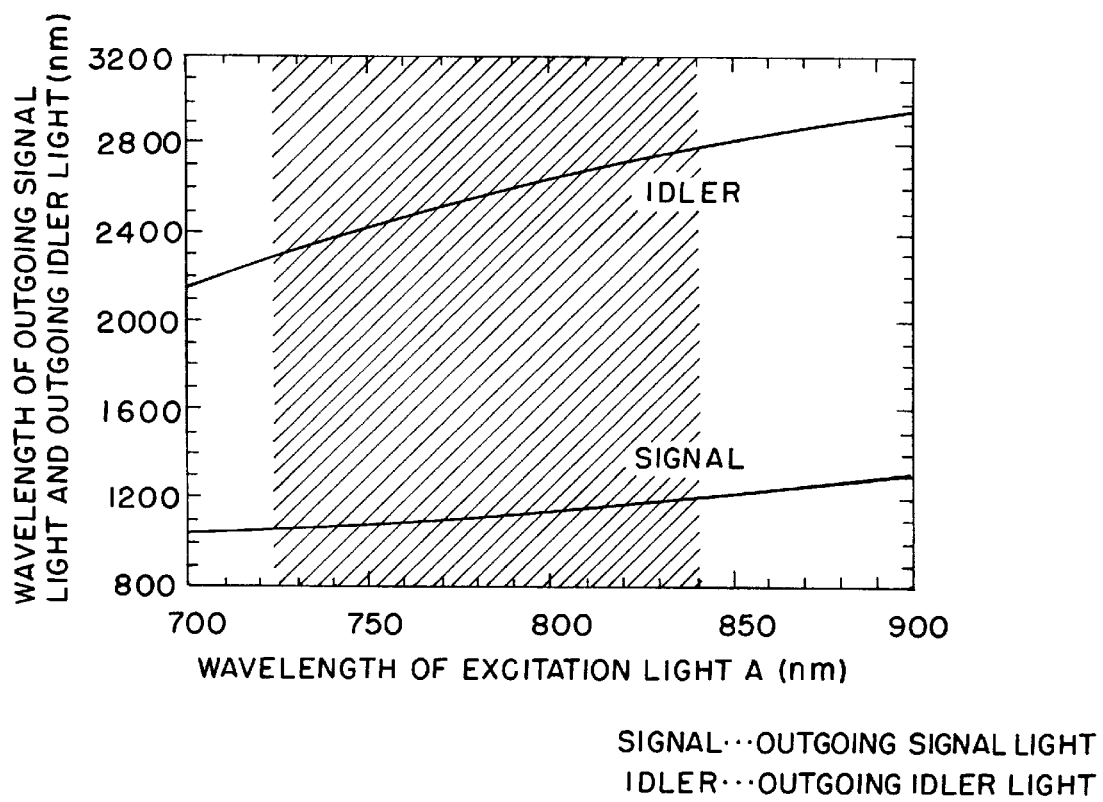
FIG. 4 is a graphical representation showing each relationship between a wavelength of excitation light and wavelengths of outgoing signal light and outgoing idler light.
Figure 5:
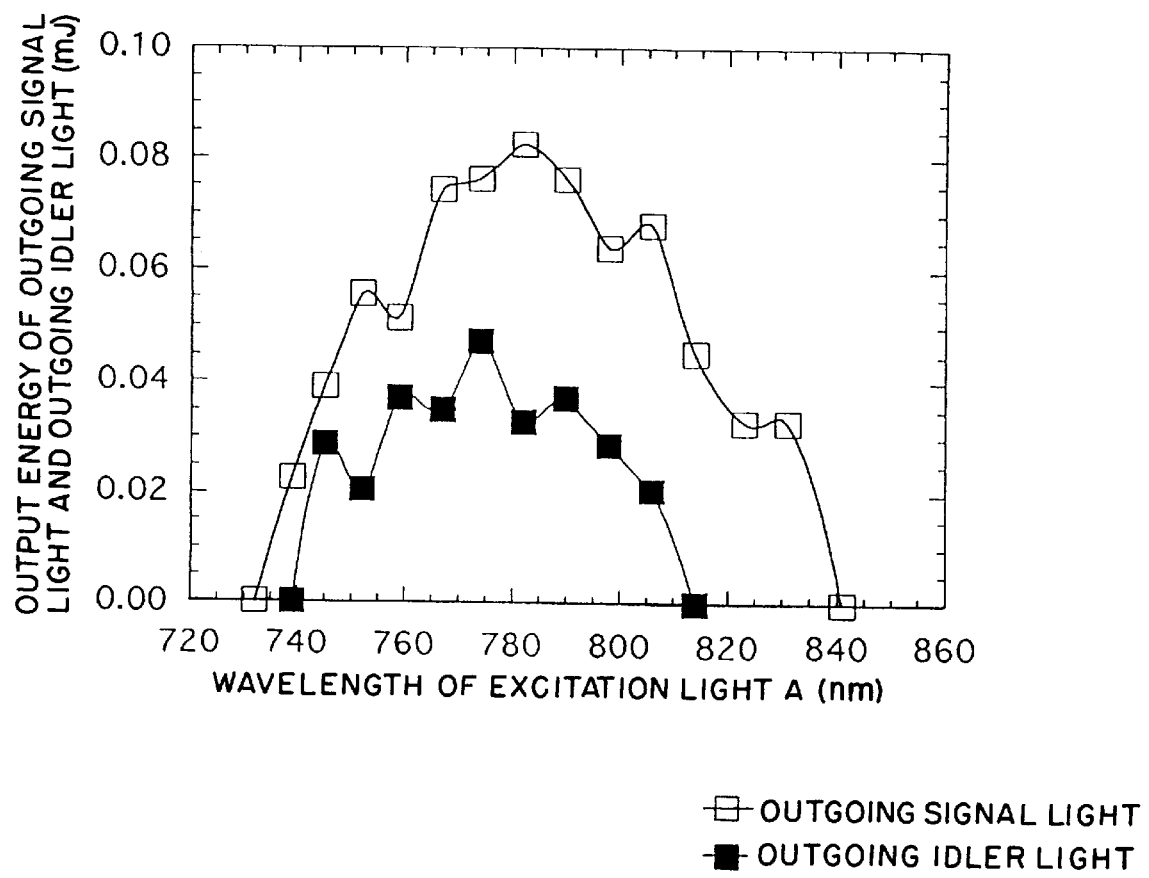
FIG. 5 is a graphical representation showing each relationship between a wavelength of the excitation light and output of the outgoing signal light and that of the outgoing idler light.
Figure 6:
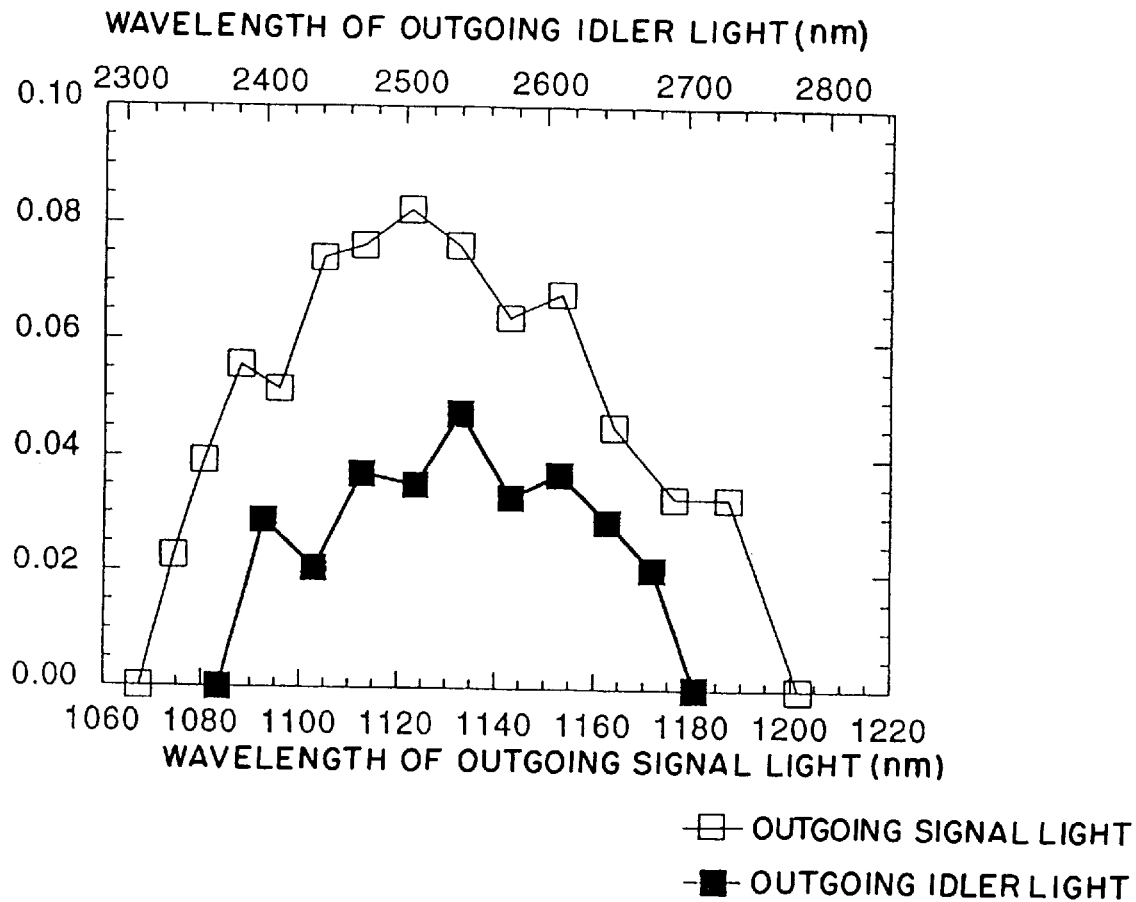
FIG. 6 is a graphical representation showing each relationship between wavelengths of the outgoing signal light as well as of the outgoing idler light and output of the outgoing signal light as well as of the outgoing idler light.

As shown in these FIGS. 4 through 6, when the optically parametric oscillator shown in FIGS. 2 and 3 is utilized, the outgoing signal light can select an arbitrary wavelength in a wavelength zone of about 1045 nm to 1370 nm to effect laser oscillation, while the outgoing idler light can select an arbitrary wavelength in a wavelength zone of about 2180 nm to 3080 nm to effect laser oscillation.

Figure 7:
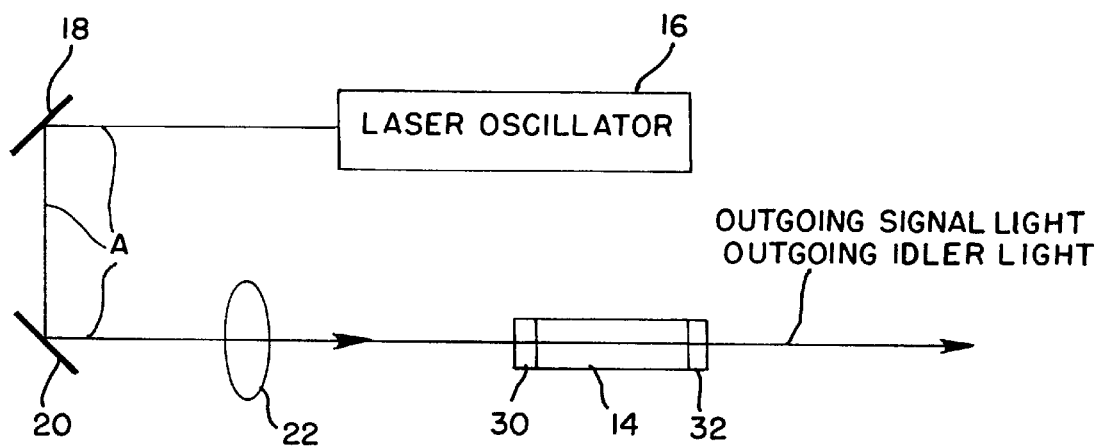
FIG. 7 is a schematic constitutional diagram for explaining another manner of practice of the optically parametric oscillator according to the present invention.

In the above described manner of practice, although the resonator has been composed of the mirror having a prescribed transmittivity on the outgoing side 10 and the total reflection mirror 12, the optically parametric oscillator may be constituted in accordance with such a manner that a reflection film 30 having the same performance as that of the total reflection mirror 12 is coated on the plane of incidence of light in the KTP crystal 14, while a reflection film 32 having the same performance as that of the mirror on the outgoing side 10 is coated on the outgoing plane of light in the KTP crystal 14 as shown in FIG. 7 without providing the resonator composed of the mirror on the outgoing side 10 and the total reflection mirror 12. In FIG. 7, the same reference characters as those of FIG. 2 designate the same or equivalent components as or to those of the optically parametric oscillator according to the manner of practice shown in FIG. 2, and the detailed description therefor will be omitted.

As shown in FIG. 7, when the optically parametric oscillator is constituted in accordance with this manner of practice, the constitution of the whole system can be made compact.

On the other hand, the constitution of the laser oscillator 16 is not limited to that shown in FIG. 3, but each constitution of the laser oscillator shown hereunder may suitably be selected to serve for use.

(The second constitution of the laser oscillator 16)

Figure 8:
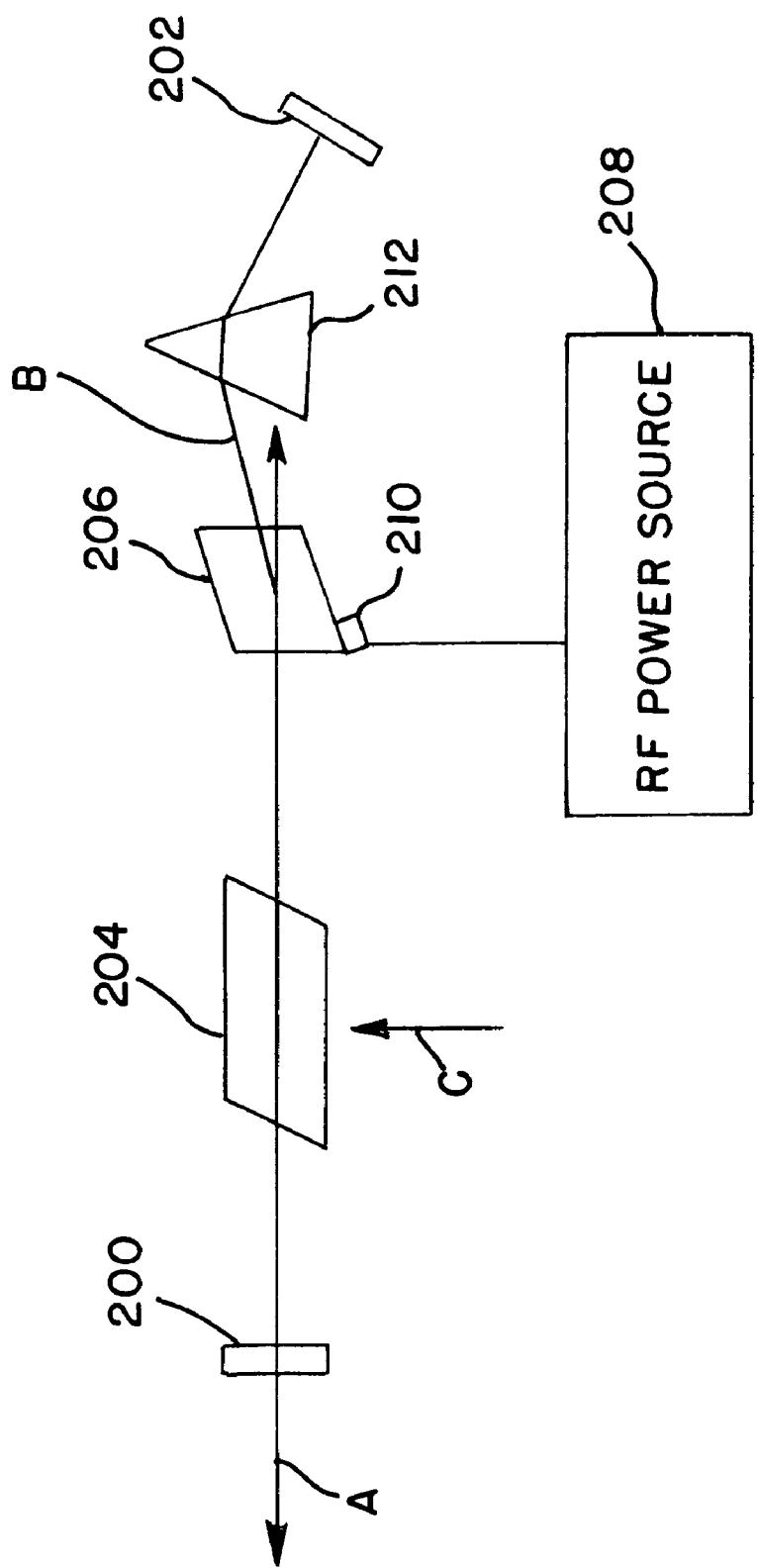
FIG. 8 is a schematic constitutional diagram for explaining the second constitution of the laser oscillator.

FIG. 8 is a schematic constitutional diagram for explaining the second constitution of the laser oscillator 16 wherein the same reference characters designate the same components as that of FIG. 3 for easy understanding.

In also the second constitution of the laser oscillator 16, a laser resonator is composed of a mirror having a prescribed transmittivity on the outgoing side 200 and a total reflection mirror 202 like the constitution shown in FIG. 3.

In the laser resonator, a Ti:Al$_2$O$_3$ laser crystal 204, an acousto-optical crystal 206, and a dispersion correcting prism 212 for correcting dispersion of diffracted light B are disposed in this order from the side of the mirror on the outgoing side 200 to that of the total reflection mirror 202. The total reflection mirror 202 is arranged so as to reflect the light outputted from the dispersion correcting prism 212.

The dispersion correcting prism 212 can make the directivity of outgoing laser beam being excitation light A constant by correcting dispersion of the diffracted light B outputted from the acousto-optical crystal 206.

Further, like the constitution shown in FIG. 3, a piezoelectric element 210 is arranged in such that acoustic wave is inputted to the acousto-optical crystal 206 so as to diffract in a prescribed direction only the outgoing light having a wavelength of the outgoing laser beam which is desired to output from the mirror on the outgoing side 200 as the excitation light A.

In the above described arrangement, the Ti:Al$_2$O$_3$ laser crystal 204 is excited by utilizing the second harmonics of Nd:YAG laser as excitation laser beam C. Furthermore, based on the principle described above, a frequency of an RF power source 208 is controlled to drive the piezoelectric element 210 in response to a wavelength of the outgoing laser beam which is intended to output from the mirror on the outgoing side 200 as the excitation light A.

In the situation described above, the outgoing light having a wavelength in response to the frequency of the RF power source 208 among the outgoing light rays outputted from the Ti:Al$_2$O$_3$ laser crystal 204, which are derived from the one inputted to the acousto-optical crystal 206 and belonging to a wide range of wavelength zone, is diffracted in a prescribed direction to be outputted from the acousto-optical crystal 206 as the diffracted light B. Furthermore, the diffracted light B outputted from the acousto-optical crystal 206 in a diffracted state along a prescribed direction is inputted to the dispersion correcting prism 212, and then outputted in a constant direction. Thereafter, the light outputted from the dispersion correcting prism 212 is reflected by the total reflection mirror 202, whereby the resulting light reciprocates inside the laser resonator.

As a result, only the light having a wavelength in response to a frequency of the RF power source 208 is amplified to generate laser oscillation, whereby only the outgoing laser beam having the aforesaid wavelength can be outputted as the excitation light A.

(The third constitution of the laser oscillator 16)

Figure 9:
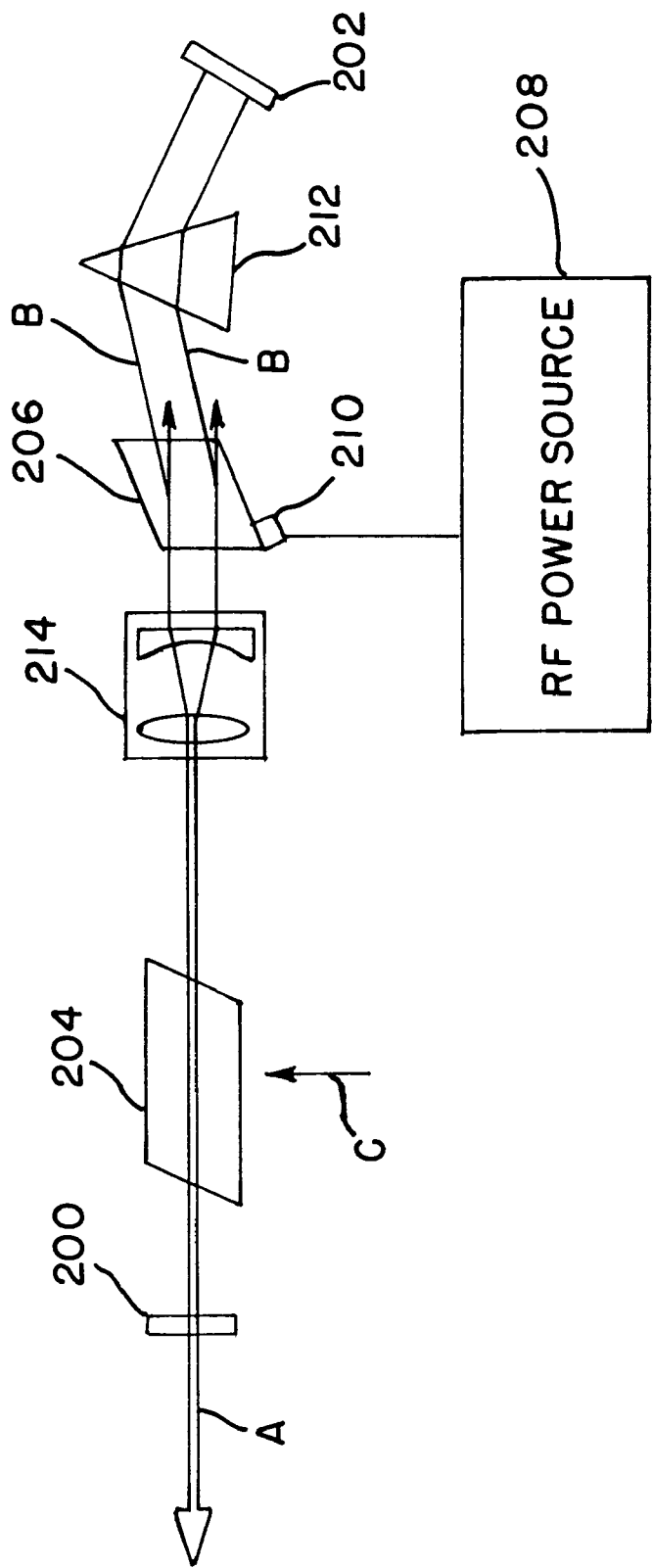
FIG. 9 is a schematic constitutional diagram for explaining the third constitution of the laser oscillator.

FIG. 9 is a schematic constitutional diagram for explaining the third constitution of the laser oscillator 16 wherein the same reference characters designate the same components as those of FIGS. 3 and 8 for easy understanding.

In also the third constitution of the laser oscillator 16, a laser resonator is composed of a mirror having a prescribed transmittivity on the outgoing side 200 and a total reflection mirror 202 in the same way as the constitution shown in FIG. 3.

In the laser resonator, a Ti:Al$_2$O$_3$ laser crystal 204, a telescope for adjusting a beam diameter 214, an acousto-optical crystal 206, and a dispersion correcting prism 212 are disposed in this order from the side of the mirror on the outgoing side 200 to that of the total reflection mirror 202. The total reflection mirror 202 is arranged so as to reflect the light outputted from the dispersion correcting prism 212. The telescope 214 is arranged such that a beam diameter of the light to be inputted to the acousto-optical crystal 206 can be expanded to a desired size. The dispersion correcting prism 212 has the same constitution as that of the second one of the laser oscillator 16 and which can make the directivity of outgoing laser beam being excitation light A constant by correcting dispersion of the diffracted light B outputted from the acousto-optical crystal 206.

Further, like the constitution shown in FIG. 3, a piezoelectric element 210 is arranged in such that acoustic wave is inputted to the acousto-optical crystal 206 so as to diffract in a prescribed direction only the outgoing light having a wavelength of the outgoing laser beam which is desired to output from the mirror on the outgoing side 200 as the excitation light A.

In the above described arrangement, the Ti:Al$_2$O$_3$ laser crystal 204 is excited by utilizing the second harmonics of Nd:YAG laser as excitation laser beam C. Furthermore, based on the principle described above, a frequency of an RF power source 208 is controlled to drive the piezoelectric element 210 in response to a wavelength of the outgoing laser beam which is intended to output from the mirror on the outgoing side 200 as the excitation light A.

In the situation described above, a beam diameter of the outgoing light outputted from the Ti:Al$_2$O$_3$ laser crystal 204 is expanded by the telescope 214 in a desired size, and the resulting outgoing light is inputted to the acousto-optical crystal 206.

Accordingly, even in the case where output power of laser rises, since a beam diameter of the light inputted to the acousto-optical crystal 206 is expanded by the telescope 214 so that output power of the light inputted to the acousto-optical crystal 206 per unit area thereof decreases, damage of the acousto-optical crystal 206 can be suppressed.

The outgoing light having a wavelength in response to the frequency of the RF power source 208 among the outgoing light rays outputted from the Ti:Al$_2$O$_3$ laser crystal 204, which are derived from the one inputted to the acousto-optical crystal 206 through the telescope 214 and belonging to a wide range of wavelength zone, is diffracted in a prescribed direction to be outputted from the acousto-optical crystal 206 as the diffracted light B. Furthermore, the diffracted light B outputted from the acousto-optical crystal 206 in a diffracted state along a prescribed direction is inputted to the dispersion correcting prism 212, and then outputted in a constant direction. Thereafter, the light outputted from the dispersion correcting prism 212 is reflected by the total reflection mirror 202, whereby the resulting light reciprocates inside the laser resonator.

As a result, only the light having a wavelength in response to a frequency of the RF power source 208 is amplified to generate laser oscillation, whereby only the outgoing laser beam having the aforesaid wavelength can be outputted as the excitation light A.

(The fourth constitution of the laser oscillator 16)

Figure 10:
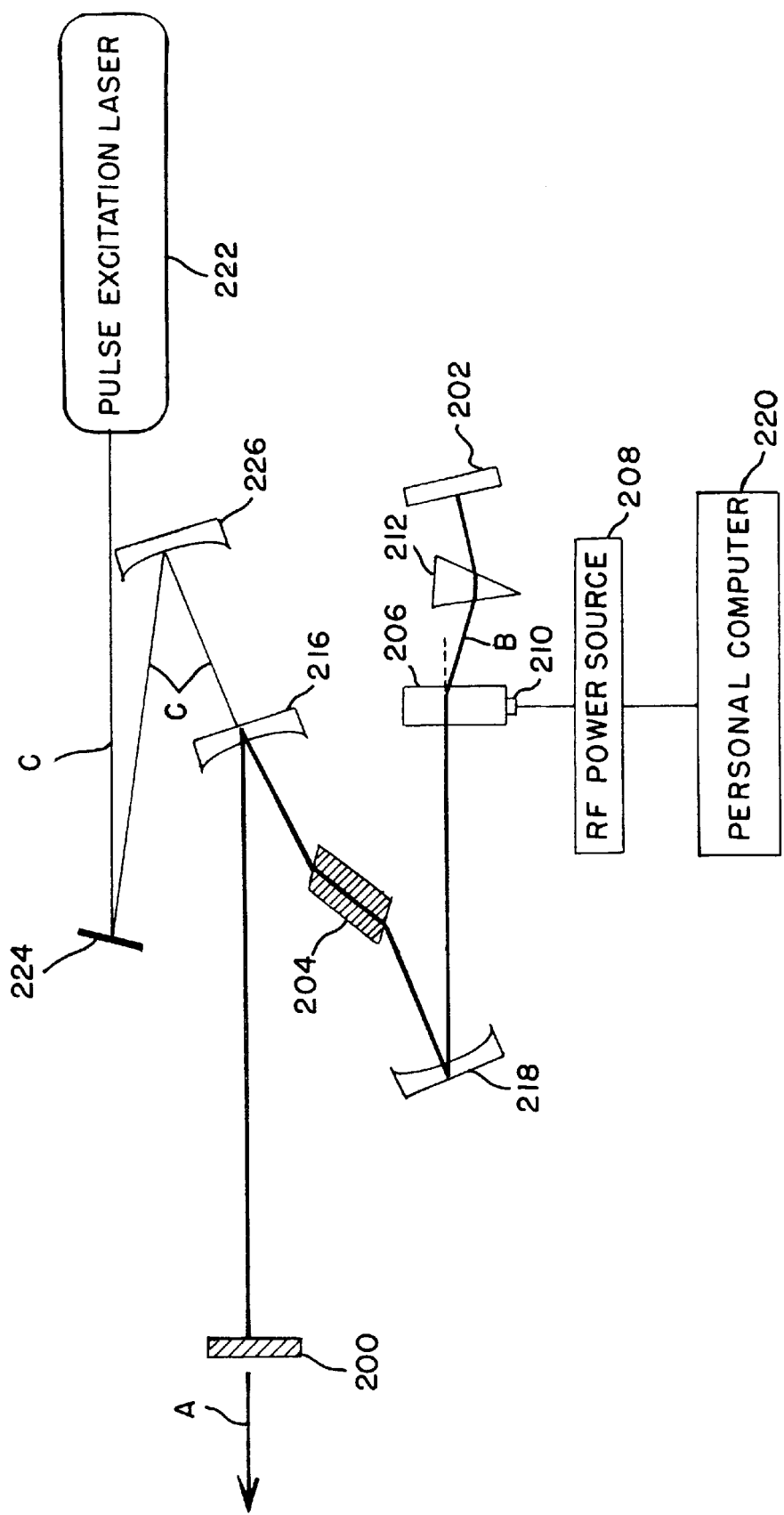
FIG. 10 is a schematic constitutional diagram for explaining the fourth constitution of the laser oscillator.

FIG. 10 is a schematic constitutional diagram for explaining the fourth constitution of the laser oscillator 16 wherein the same reference characters designate the same components as those of FIGS. 3, 8 and 9 for easy understanding.

In the fourth constitution of the laser oscillator 16, a so-called Z-holding type laser resonator wherein an optical path of the light reciprocating inside the laser resonator exhibits a "Z"-shaped path is used. This laser resonator of Z-holding type is composed of a mirror having a prescribed transmittivity on the outgoing side 200 and a total reflection mirror 202.

Moreover, the laser resonator of Z-holding type is arranged in such that excitation laser beam C is inputted thereto, and is provided with a first intermediate mirror 216 reflecting the light reciprocating between the mirror on the outgoing side 200 and the total reflection mirror 202 as well as with a second intermediate mirror 218 reflecting the light reciprocating between the mirror on the outgoing side 200 and the total reflection mirror 202. The optical path of the light B reciprocating inside the laser resonator exhibits a "Z"-shaped path.

Between the first intermediate mirror 216 and the second intermediate mirror 218 on the optical path of the laser resonator is disposed, as a wavelength tunable lasermedium, a Ti:Al$_2$O$_3$ laser crystal 204 the incident end surface thereof for incident light has been Brewster-cut in such that the incident end surface is of a Brewster angle wherein reflection of the incident light becomes zero, so that laser oscillation is generated by coaxial excitation in the longitudinal direction due to excitation laser beam C.

Furthermore, an acousto-optical crystal 206 being the one as a crystal for selecting wavelength and having birefringent property is disposed between the second intermediate mirror 218 and the total reflection mirror 202 on the optical path of the laser resonator.

In addition, to the acousto-optical crystal 206 is attached, as an acoustic wave inputting means, a piezoelectric element 210 driven by an RF power source 208 a frequency of which is controlled by a personal computer 220. Thus, when the piezoelectric element 210 is driven by the RF power source 208 wherein the frequency thereof has been set to an arbitrary value in accordance with the control of the personal computer 220 to thereby cause strain in the piezoelectric element 210, based on this strain of the piezoelectric element 210, acoustic wave having a frequency in response to the above described strain is inputted to the acousto-optical crystal 206. As a result, the acousto-optical crystal 206 diffracts only the light in response to the acoustic wave inputted.

Accordingly, inputting of acoustic wave to the acousto-optical crystal 206 is controlled by the personal computer 220 in such a manner that only the light having a wavelength of the outgoing laser beam which is intended to output from the mirror on the outgoing side 200 as the excitation light A by means of the piezoelectric element 210 can be outputted as the diffracted light B which has been diffracted by the acousto-optical crystal 206 in a prescribed direction thereby being capable of making laser oscillation.

Furthermore, a dispersion correcting prism 212 for correcting dispersion of the diffracted light B is disposed between the acousto-optical crystal 206 and the total reflection mirror 202. By the use of the dispersion correcting prism 212, directivity of outgoing laser beam being the excitation light A can keep constant.

In the fourth constitution of the laser oscillator 16, a pulse excitation laser 222 is used as the laser for inputting excitation light C to the laser resonator. An example of the pulse excitation laser 222 includes a compact, highly repeated laser diode (LD) excitation solid laser and the like. More specifically, CW-Q-switch pulse YAG laser, CW-Q-switch pulse Nd:YLF laser and the like may be employed.

The excitation laser light C produced by the pulse excitation laser 222 is reflected to a total reflection beam-condensing mirror 226 by the total reflection mirror 224 to be collected by the total reflection beam-condensing mirror 226, and is inputted through the first intermediate mirror 216 so as to cause the Ti:Al$_2$O$_3$ 204 to effect coaxial excitation in the longitudinal direction.

In the above described arrangement, to obtain outgoing laser beam being the excitation light A, the Ti:Al$_2$O$_3$ laser crystal 204 is excited by utilizing the excitation laser beam C inputted by the pulse excitation laser 222. According to the principle described above, a frequency of the RF power source 208 is controlled by the personal computer 220 to oscillate the piezoelectric element 210 in response to a wavelength of the outgoing laser beam which is desired to output as the excitation light A from the mirror on the outgoing side 200.

In the situation described above, the outgoing light having a wavelength in response to the frequency of the RF power source 208 among the outgoing light rays outputted from the Ti:Al$_2$O$_3$ laser crystal 204, which are derived from the one inputted to the acousto-optical crystal 206 and belonging to a wide range of wavelength zone, is diffracted in a prescribed direction to be outputted from the acousto-optical crystal 206 as the diffracted light B. Furthermore, the diffracted light B outputted from the acousto-optical crystal 206 in a diffracted state along a prescribed direction is inputted to the total reflection mirror 202 through the dispersion correcting prism 212, so that the light inputted is reflected by the total reflection mirror 202, whereby the resulting light reciprocates inside the laser resonator along the "Z"-shaped optical path.

As a result, only the light having a wavelength in response to a frequency of the RF power source 208 is amplified to generate laser oscillation, whereby only the outgoing laser beam having the aforesaid wavelength can be outputted as the excitation light A from the laser resonator.

As described above, selection for a wavelength of outgoing laser beam being the excitation light A can be realized in control of the personal computer 220 by selecting a frequency of the RF power source 208 to vibrate the piezoelectric element 210 by means of the RF power source 208. Accordingly, a rapid and random selection of a wavelength of the outgoing laser beam being the excitation light A is possible, so that a wavelength tuning speed of the outgoing laser beam being the excitation laser A can be elevated.

Moreover, since the dispersion correcting prism 212 is disposed, dispersion of a diffraction angle of the diffracted light B is corrected. If there is dispersion in a diffraction angle of the diffracted light B, an optical path of the light changes inside the laser resonator, whereby a wavelength variable zone is limited. In this respect, however, when the dispersion correcting prism 212 is provided, the problem as described above can be eliminated.

Besides, the constitution of the laser resonator is constituted into Z-holding type, and it is arranged in such that the excitation laser beam C is collected by the total reflection beam-condensing mirror 226 to input the same to the Ti:Al$_2$O$_3$ laser crystal 204. Hence, laser oscillation can be made sufficiently even although the excitation laser beam C derived from the pulse excitation laser 222 has low excitation input power.

(The fifth constitution of the laser oscillator 16)

Figure 11:
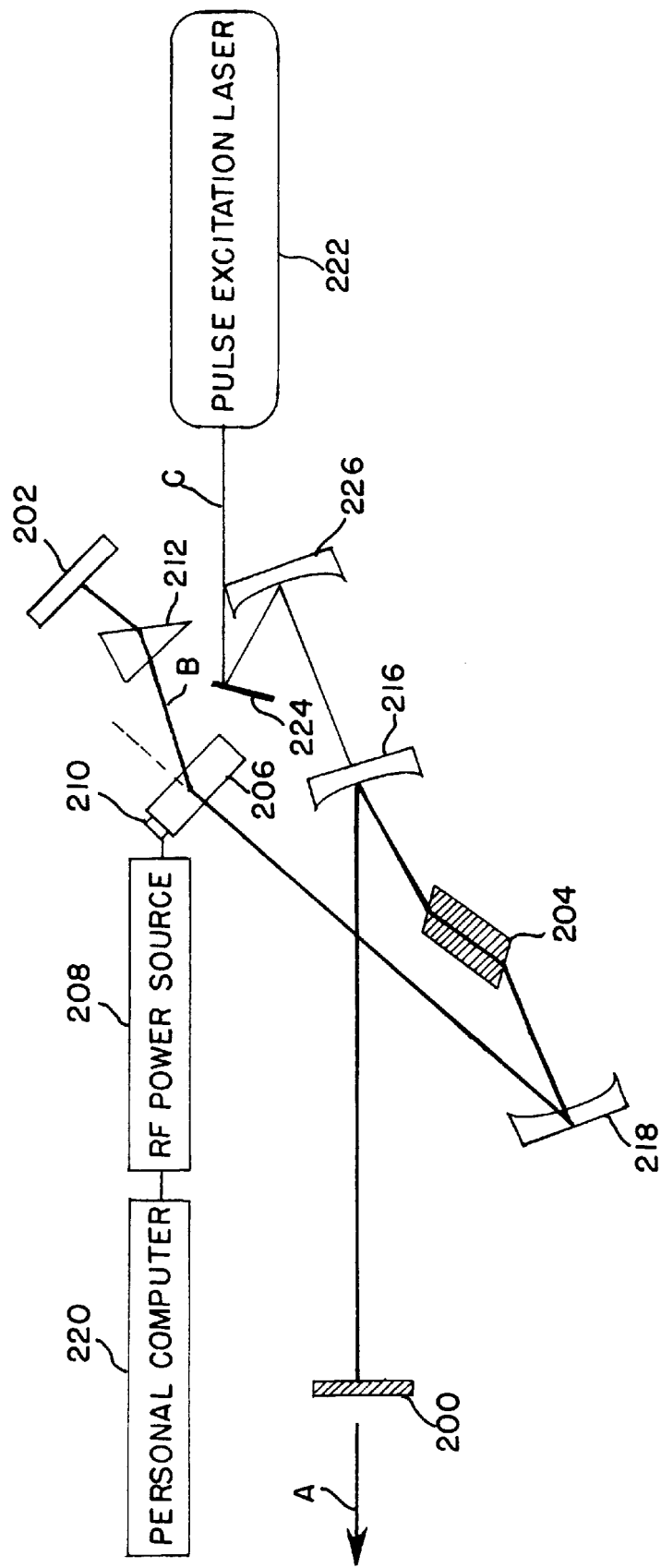
FIG. 11 is a schematic constitutional diagram for explaining the fifth constitution of the laser oscillator.

FIG. 11 is a schematic constitutional diagram for explaining the fifth constitution of the laser oscillator 16 wherein the same reference characters designate the same components as those of FIGS. 3, 8, 9 and 10 for easy understanding, and the detailed explanation therefor will be omitted.

The fifth constitution of the laser oscillator 16 differs from that of the fourth constitution of the laser oscillator 16 shown in FIG. 10 in only the point that a constitution of the laser resonator is constituted in a so-called X-holding type.

In also the X-holding type laser resonator used in the fifth constitution of the laser oscillator 16, since excitation laser beam C is collected by a total reflection beam-condensing mirror 226 to input the laser beam thus collected to a Ti:Al$_2$O$_3$ laser crystal 18, laser oscillation can made sufficient even although the excitation laser beam C derived from a pulse excitation laser 222 having low excitation input power.

In addition, according to the laser resonator of this X-holding type, the constitution thereof can make more compact than that of a laser resonator of Z-holding type.

(The sixth constitution of the laser oscillator 16)

Figure 12:
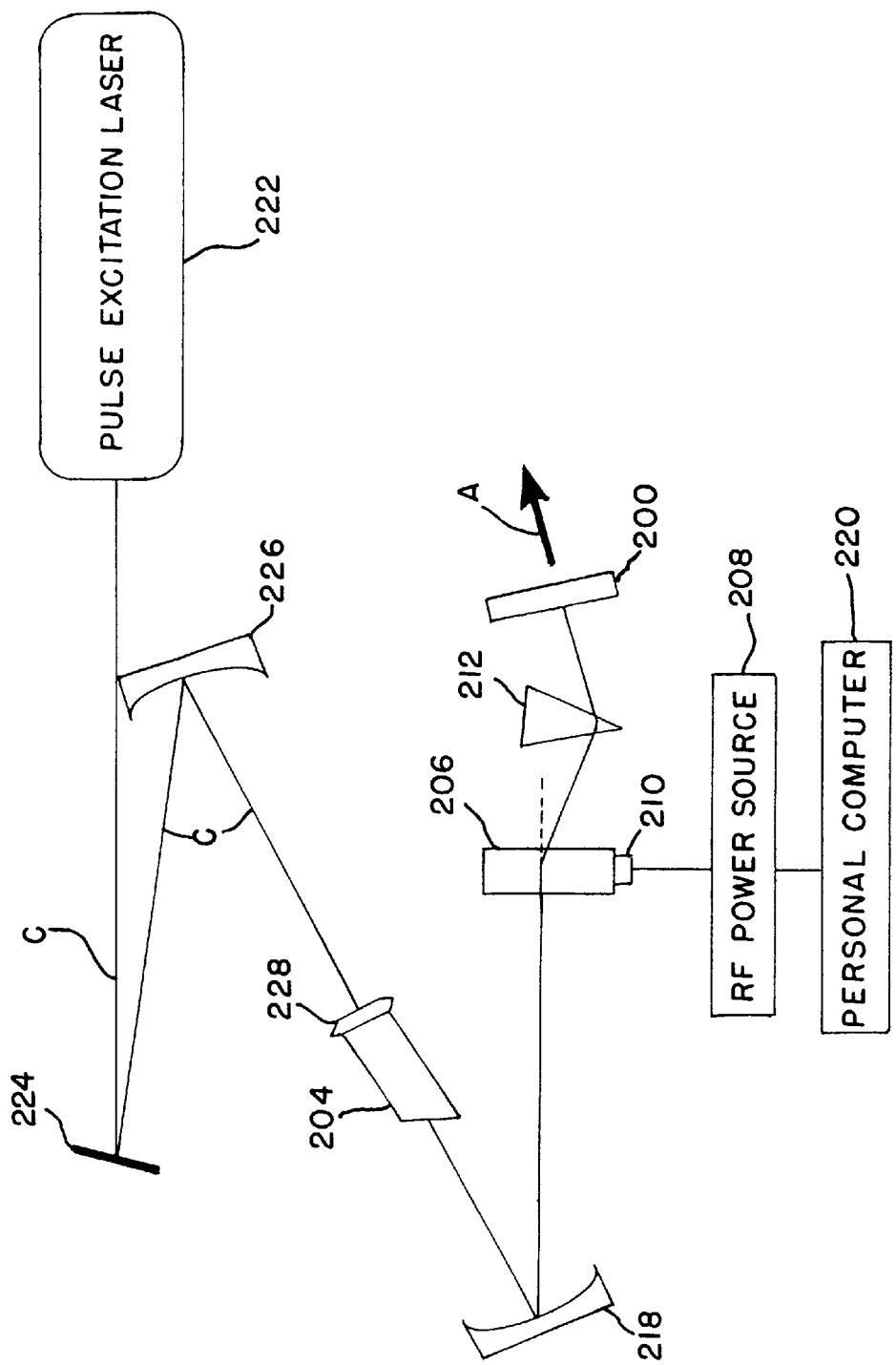
FIG. 12 is a schematic constitutional diagram for explaining the sixth constitution of the laser oscillator.

FIG. 12 is a schematic constitutional diagram for explaining the sixth constitution of the laser oscillator 16 wherein the same reference characters designate the same components as those of FIGS. 3, 8, 9, 10 and 11 for easy understanding, and the detailed explanation therefor will be omitted.

The sixth constitution of the laser oscillator 16 differs from that of the fourth constitution of the laser oscillator 16 shown in FIG. 10 in only the point that the total reflection mirror 202 of FIG. 10 is replaced by a mirror on the outgoing side 200, and at the same time, in place of removing the mirror on the outgoing side 200 and the first intermediate mirror 216 in FIG. 10, such an arrangement that excitation laser beam C is inputted to the end surface of the Ti:Al$_2$O$_3$ laser crystal 204 on the side to which the excitation laser beam C is inputted, besides a specular coating 228 for reflecting the light outputted from the Ti:Al$_2$O$_3$ laser crystal 204 is applied is added to the modification described herein.

Thus, in the sixth constitution of the laser oscillator 16, a laser resonator is composed of the specular coating 228 and the mirror on the outgoing side 200.

For this reason, according to the sixth constitution of the laser oscillator 16, the number of components in the sixth constitution can be reduced in comparison with that of the fourth constitution of the laser oscillator 16 shown in FIG. 10 as well as with that of the fifth constitution of the laser oscillator 16 shown in FIG. 11, whereby the whole system can be miniaturized, besides decrease in the cost therefor can be achieved.

(The seventh constitution of the laser oscillator 16)

Figure 13:
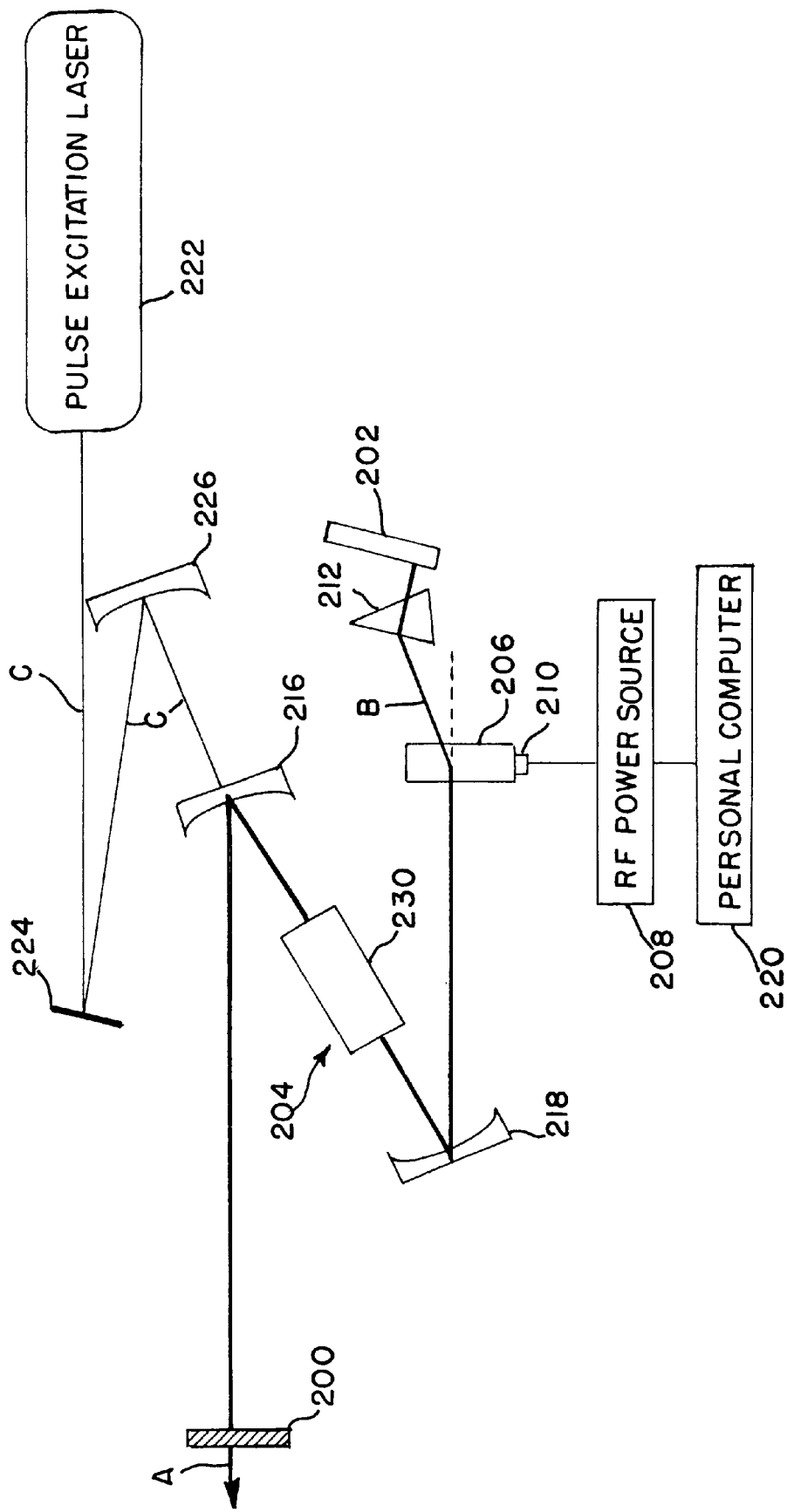
FIG. 13 is a schematic constitutional diagram for explaining the seventh constitution of the laser oscillator.

FIG. 13 is a schematic constitutional diagram for explaining the seventh constitution of the laser oscillator 16 wherein the same reference characters designate the same components as those of FIGS. 3, 8, 9, 10, 11 and 12 for easy understanding, and the detailed explanation therefor will be omitted.

The seventh constitution of the laser oscillator 16 differs from that of the fourth constitution of the laser oscillator 16 shown in FIG. 10 in the point that not such an arrangement that the inputting end surface of a Ti:Al$_2$O$_3$ laser crystal 204 to which is inputted incident light has been Brewster-cut, and the crystal is disposed at a Brewster angle is applied, but such an arrangement that the Ti:Al$_2$O$_3$ laser crystal 204 has been subjected to vertical incident-cutting, at the same time, a non-reflecting coating 230 has been applied, and the crystal is disposed in such that excitation laser beam C is vertically inputted is applied.

As described above, setting of the disposition of the Ti:Al$_2$O$_3$ laser crystal 204 where the excitation laser beam C is vertically inputted is easier than that of the Ti:Al$_2$O$_3$ crystal 204 where it is placed at the Brewster-angle, besides dispersion of the angle is small, so that a wide wavelength zone can be obtained.

(The eighth constitution of the laser oscillator 16)

Figure 14:
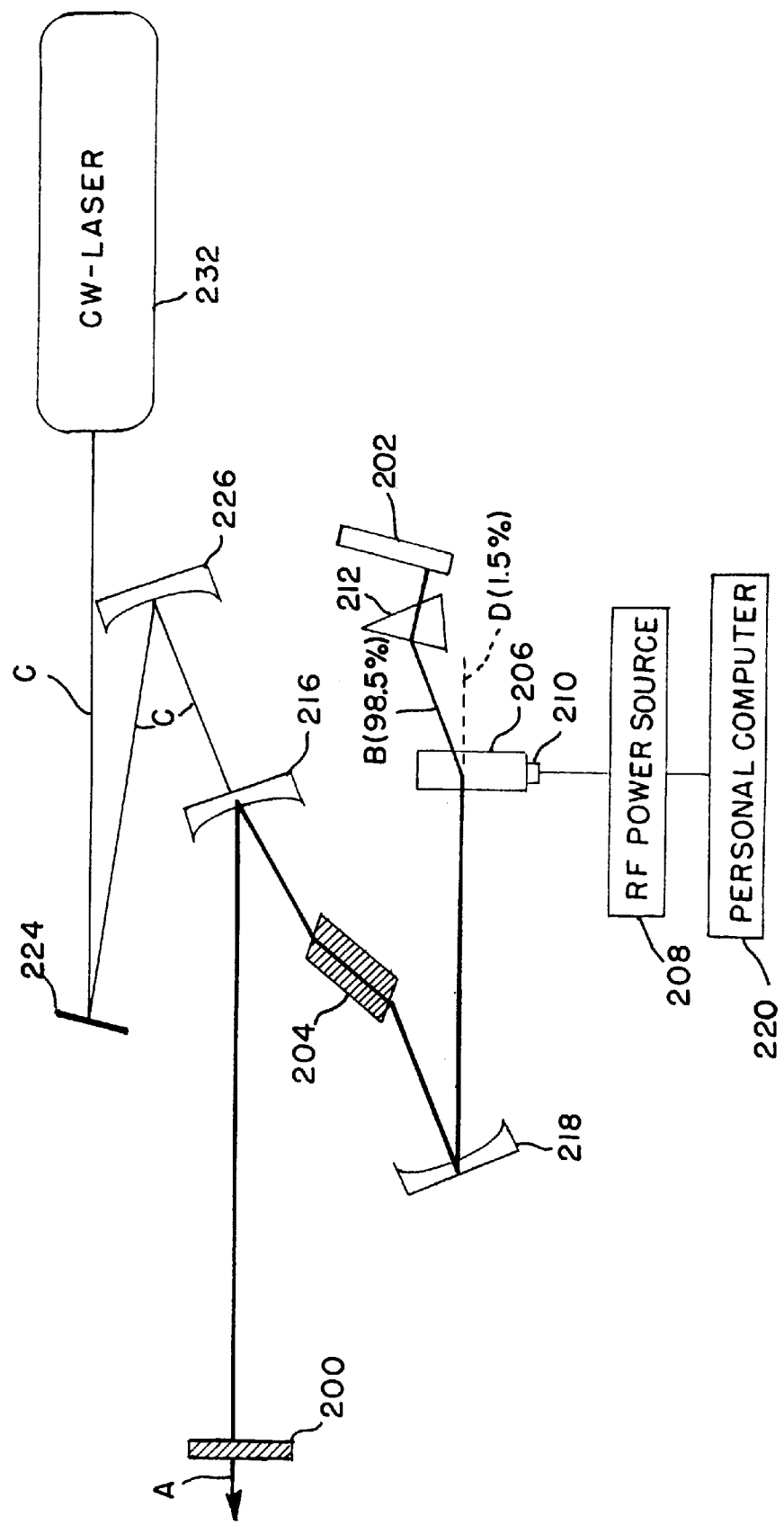
FIG. 14 is a schematic constitutional diagram for explaining the eighth constitution of the laser oscillator.

FIG. 14 is a schematic constitutional diagram for explaining the eighth constitution of the laser oscillator 16 wherein the same reference characters designate the same components as those of FIGS. 3, 8, 9, 10, 11, 12 and 13 for easy understanding.

The eighth constitution of the laser oscillator 16 contains a so-called Z-holding type laser resonator wherein an optical path of the light reciprocating inside the laser resonator exhibits "Z"-shaped path, and the laser resonator of Z-holding type is provided with a mirror on the outgoing side 200 having a prescribed transmittivity (for example, the mirror reflects 98% of the light inputted, and transmits 2% of the same) and a total reflection mirror 202 reflecting totally the light inputted (the mirror reflects 100% of the light inputted).

Furthermore, the Z-holding type laser resonator contains a first intermediate mirror 216 to which is inputted excitation laser beam C, and which reflects totally the light reciprocating between the mirror on the outgoing side 200 and the total reflection mirror 202 and a second intermediate mirror 218 which reflects totally the light reciprocating between the mirror on the outgoing side 200 and the total reflection mirror 202, besides the laser resonator is arranged in such that an optical path of the light reciprocating inside the laser resonator exhibits "Z"-shaped path.

Between the first intermediate mirror 216 and the second intermediate mirror 218 and on the optical path of the laser resonator is disposed, as a wavelength tunable laser medium, a Ti:Al$_2$O$_3$ laser crystal 204 the incident end surface thereof for incident light has been Brewster-cut in such that the incident end surface is of a Brewster angle wherein reflection of the incident light becomes zero, so that laser oscillation is caused by coaxial excitation in the longitudinal direction due to excitation laser beam C.

Furthermore, an acousto-optical crystal 206 being the one as a crystal for selecting wavelength and having birefringent property is disposed between the second intermediate mirror 218 and the total reflection mirror 202 on the optical path of the laser resonator.

In addition, to the acousto-optical crystal 206 is attached, as an acoustic wave inputting means, a piezoelectric element 210 driven by an RF power source 208 a frequency of which is controlled by a personal computer 220. Thus, when the piezoelectric element 210 is driven by the RF power source 208 wherein the frequency thereof has been set to an arbitrary value in accordance with the control of the personal computer 220 to thereby cause strain in the piezoelectric element 210, based on this strain of the piezoelectric element 210, acoustic wave having a frequency in response to the above described strain is inputted to the acousto-optical crystal 206. As a result, the acousto-optical crystal 206 diffracts only the light in response to the acoustic wave inputted.

Accordingly, inputting of acoustic wave to the acousto-optical crystal 206 is controlled by the personal computer 220 in such a manner that only the light having a wavelength of the outgoing laser beam which is intended to output from the mirror on the outgoing side 200 as the excitation light A by means of the piezoelectric element 210 can be outputted as the diffracted light B which has been diffracted by the acousto-optical crystal 206 in a prescribed direction thereby being capable of making laser oscillation.

Furthermore, a dispersion correcting prism 212 for correcting dispersion of the diffracted light B is disposed between the acousto-optical crystal 206 and the total reflection mirror 202. By the use of the dispersion correcting prism 212, directivity of outgoing laser beam being the excitation light A can keep constant.

In the eighth constitution of the laser oscillator 16, a continuous oscillation laser (CW-laser) 232 is used as the laser for inputting excitation light C to the laser resonator. A specific example of the CW-laser 232 includes the second harmonics such as continuous oscillation Ar ion-laser (CW-Ar ion-laser) or the like, and continuous oscillation Nd:YAG laser (CW-Nd:YAG laser) or the like.

In the case where LiSAF laser crystal, LiCAF laser crystal or the like is utilized in place of the Ti:$Al_2O_3$ laser crystal 204 as a wavelength tunable lasermedium, the second harmonics of solid laser such as Nd:YAG laser, Nd:YLF laser, Nd:$YVO_4$ laser and the like may be employed as the CW-laser 232.

The excitation laser light C produced by the CW-laser 232 is reflected to a total reflection beam-condensing mirror 226 by the total reflection mirror 224 to be collected by the total reflection beam-condensing mirror 226, and is inputted through the first intermediate mirror 216 so as to cause the Ti:$Al_2O_3$ 204 coaxial excitation in the longitudinal direction.

In this case, it is required to employ such an acousto-optical crystal 206 having a high diffraction efficiency, as much as possible, as to the diffracted light B outputted from the acousto-optical crystal 206 for the sake of causing laser oscillation by means of continuous oscillation laser beam having low power derived from the CW-laser 232 which is inputted into the laser resonator as the excitation laser beam C.

In the above described arrangement, to obtain outgoing laser beam being the excitation light A, the Ti:$Al_2O_3$ laser crystal 204 is excited by utilizing the excitation laser beam C inputted by the CW laser 232. According to the principle described above, a frequency of the RF power source is controlled by the personal computer 220 to vibrate the piezoelectric element 210 in response to a wavelength of the outgoing laser beam which is desired to output as the excitation light A from the mirror on the outgoing side 200.

In the situation described above, the outgoing light having a wavelength in response to the frequency of the RF power source 208 among the outgoing light rays outputted from the Ti:$Al_2O_3$ laser crystal 204, which are derived from the one inputted to the acousto-optical crystal 206 and belonging to a wide range of wavelength zone, is diffracted in a prescribed direction to be outputted from the acousto-optical crystal 206 as the diffracted light B. Furthermore, the diffracted light B outputted from the acousto-optical crystal 206 in a diffracted state along a prescribed direction is inputted to the total reflection mirror 202 through the dispersion correcting prism 212, so that the light inputted is reflected by the total reflection mirror 202, whereby the resulting light reciprocates inside the laser resonator along the "Z"-shaped optical path.

As a result, only the light having a wavelength in response to a frequency of the RF power source 208 is amplified to generate laser oscillation, whereby only the outgoing laser beam having the aforesaid wavelength can be outputted as the excitation light A.

As described above, selection for a wavelength of outgoing laser beam being the excitation light A can be realized in control of the personal computer 220 by selecting a frequency of the RF power source 208 to vibrate the piezoelectric element 210 by means of the RF power source 208. Accordingly, tuning of wavelength in case of laser oscillation becomes possible at high speed, and as a result a rapid and random selection of a wavelength of the outgoing laser beam being the excitation light A is possible, so that a wavelength tuning speed of the outgoing laser beam being the excitation laser A can be elevated.

Moreover, since the dispersion correcting prism 212 is disposed, dispersion of the diffracted light B is corrected. If the diffracted light B is dispersed, an optical path of the light changes inside the laser resonator, whereby a wavelength variable zone is limited. In this respect, however, when the dispersion correcting prism 212 is provided, the problem as described above can be eliminated. In addition to the above, variations in an outgoing direction of the outgoing laser beam being the excitation light A which arise in case of tuning of wavelength can also be corrected. Besides, the laser resonator is constituted into Z-holding type, and it is arranged in such that the excitation laser beam C is collected by the total reflection beam-condensing mirror 226 to input the same to the Ti:$Al_2O_3$ laser crystal 204. Hence, laser oscillation can be conducted sufficiently even by the excitation laser beam C derived from the CW-laser 232 having low excitation input power.

(The ninth constitution of the laser oscillator 16)

Figure 15:
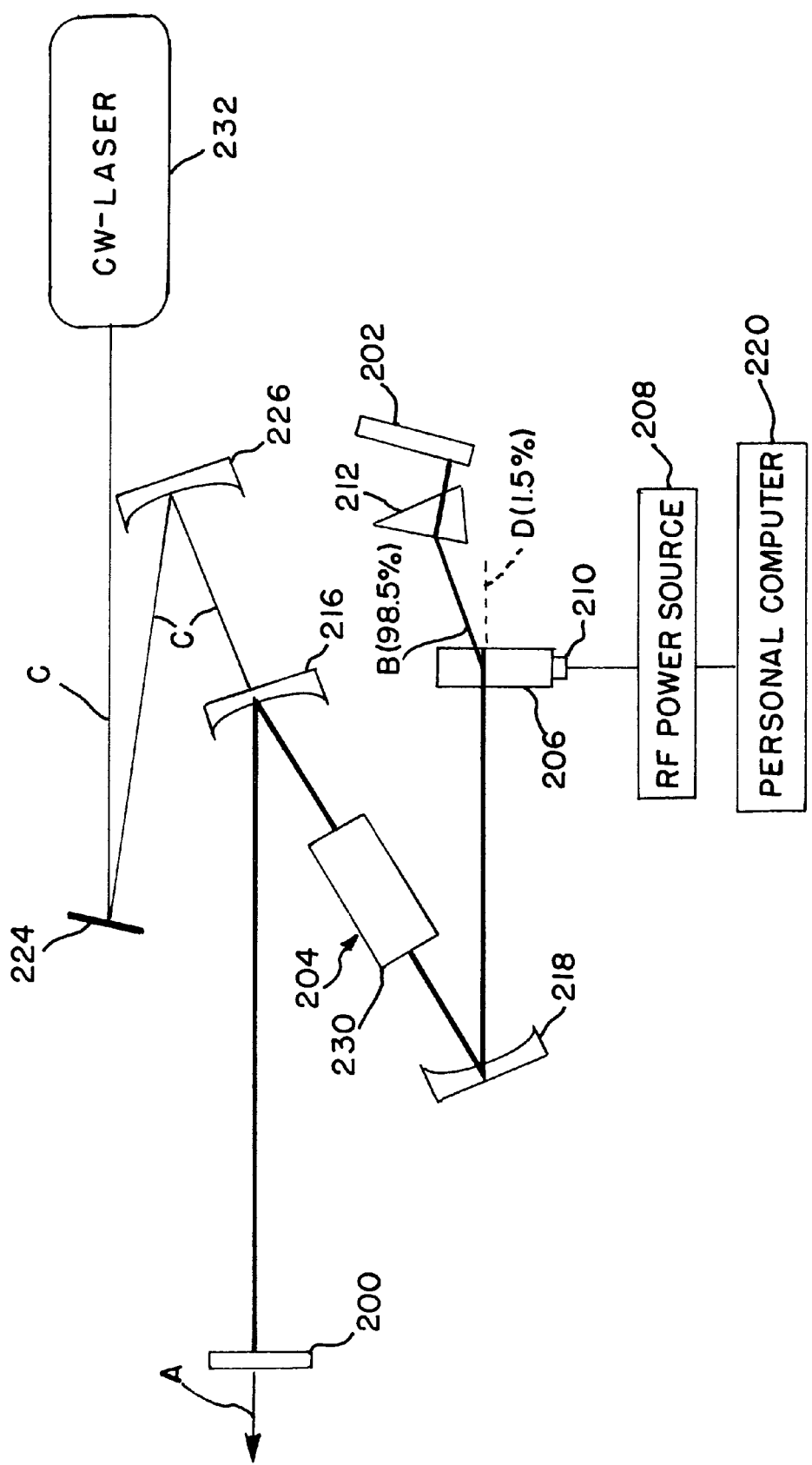
FIG. 15 is a schematic constitutional diagram for explaining the ninth constitution of the laser oscillator.

FIG. 15 is a schematic constitutional diagram for explaining the ninth constitution of the laser oscillator 16 wherein the same reference characters designate the same components as those of FIGS. 3, 8, 9, 10, 11, 12, 13 and 14 for easy understanding, and the detailed explanation therefor will be omitted.

The ninth constitution of the laser oscillator 16 differs from that of the eighth constitution of the laser oscillator 16 shown in FIG. 14 in the point that not such an arrangement that the inputting end surface of a Ti:$Al_2O_3$ laser crystal 204 has been Brewster-cut, and the crystal is disposed at a Brewster angle is applied, but such an arrangement that the Ti:$Al_2O_3$ laser crystal 204 has been subjected to vertical incident-cutting, at the same time, a non-reflecting coating 230 has been applied, and the crystal is disposed in such that excitation laser beam C is vertically inputted is applied.

As described above, setting of the disposition of the Ti:$Al_2O_3$ laser crystal 204 where the excitation laser beam C is vertically inputted is easier than that of the Ti:Al$_2$O$_3$ crystal 204 where it is placed at the Brewster-angle, besides dispersion of the angle is small, so that a wide wavelength zone can be obtained.

(The tenth constitution of the laser oscillator 16)

Figure 16:
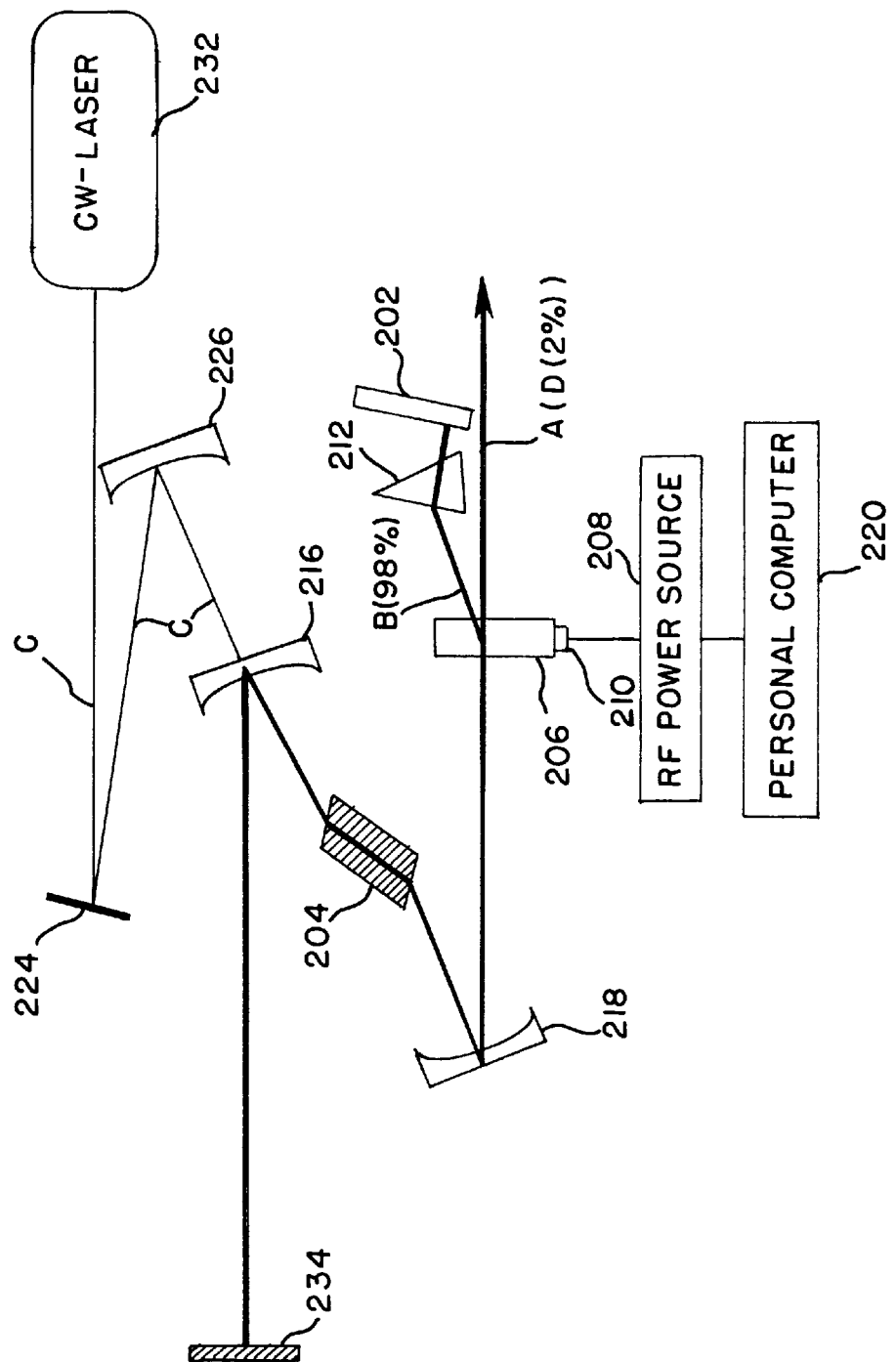
FIG. 16 is a schematic constitutional diagram for explaining the tenth constitution of the laser oscillator.

FIG. 16 is a schematic constitutional diagram for explaining the tenth constitution of the laser oscillator 16 wherein the same reference characters designate the same components as those of FIGS. 3, 8, 9, 10, 11, 12, 13, 14 and 15 for easy understanding, and the detailed explanation therefor will be omitted.

The tenth constitution of the laser oscillator 16 differs from that of the eighth constitution of the laser oscillator 16 shown in FIG. 14 in the point that the mirror on the outgoing side 200 of FIG. 14 is replaced by a total reflection mirror 234 having 100% reflection, and non-diffracted light D is outputted as outgoing laser beam being excitation light A.

According to the tenth constitution of the laser oscillator 16, since the transparent mirror on the outgoing side 200 is not used, the loss in light due to a laser resonator can be reduced as compared with that of the eighth constitution of the laser oscillator 16 shown in FIG. 14, so that it becomes possible to set a ratio of the diffracted light B outputted from an acousto-optical crystal 206 to the non-diffracted light D in such that for example, the diffracted light B is 98%, while the non-diffracted light D is 2%, whereby a ratio of the diffracted light B can be reduced. Therefore, a margin of safety in setting of the acousto-optical crystal 206 and a dispersion correcting prism 212 as well as in control of a piezoelectric element 210 by means of an RF power source 208 wherein a personal computer 220 is employed can be more elevated than that of the eighth constitution of the laser oscillator 16 shown in FIG. 14.

Since the present invention is constituted as described above, speed-up of a wavelength tuning speed of excitation light is possible, so that it results in such an excellent advantage that signal light and idler light can vary at high speed.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

The entire disclosure of Japanese Patent Application No. 8-132848 filed on Apr. 30, 1996 including specification, claims, drawings and summary are incorporated herein by reference in its entirety.

What is claimed is:

1. An optically parametric laser oscillator wherein a resonator is composed of an output coupling mirror having a prescribed transmittivity and a total reflection mirror, a nonlinear crystal is disposed in the resonator, the outgoing laser beam outputted from the optically parametric laser oscillator is inputted into said resonator as excitation light to excite the nonlinear crystal, whereby both signal light and idler light having a wavelength in response to the wavelength of the excitation light, respectively, are outputted, comprising:

a laser resonator composed of opposed mirrors each having a prescribed reflectivity, a wavelength tunable laser medium disposed in said laser resonator and capable of laser oscillation in the wavelength zone within a prescribed range, an acousto-optical crystal disposed in said laser resonator, a beam expander located between said wavelength tunable laser medium and said acousto-optical crystal, said beam expander expanding a beam diameter of light outputted from said wavelength tunable laser medium to prevent damage to said acousto-optical crystal, and an acoustic wave inputting means mounted to said acousto-optical crystal and for inputting acoustic waves to said acousto-optical crystal.

2. An optically parametric laser oscillator wherein a resonator is composed of an output coupling mirror having a prescribed transmittivity and a total reflection mirror, a nonlinear crystal is disposed in the resonator, the outgoing laser beam outputted from the optically parametric laser oscillator is inputted into the resonator as excitation light to excite the nonlinear crystal, whereby both signal light and idler light having a wavelength in response to the wavelength of the excitation light, respectively, are outputted, comprising:

a laser resonator composed of opposed mirrors each having a prescribed reflectivity, a wavelength tunable laser medium disposed in said laser resonator and capable of laser oscillation in the wavelength zone within a prescribed range, an acousto-optical crystal disposed in said laser resonator, a beam expander located between said wavelength tunable laser medium and said acousto-optical crystal, said beam expander expanding a beam diameter of light outputted from said wavelength tunable laser medium to prevent damage to said acousto-optical crystal, an acoustic wave inputting means mounted to said acousto-optical crystal and for inputting acoustic waves to said acousto-optical crystal, and an optical element disposed in said laser oscillator and for correcting dispersion of the diffracted light outputted from said acousto-optical crystal.

3. The optically parametric oscillator according to claim 1, wherein said beam expander is a telescope.

4. The optically parametric oscillator according to claim 2, wherein said beam expander is a telescope.

5. The optically parametric oscillator according to claim 1, wherein the total reflection mirror is a specular coating on an input side of said wavelength tunable laser medium.

6. The optically parametric oscillator according to claim 2, wherein the total reflection mirror is a specular coating on an input side of said wavelength tunable laser medium.

7. The optically parametric oscillator according to claim 1, wherein said wavelength tunable laser medium includes a Brewster-cut input surface.

8. The optically parametric oscillator according to claim 2, wherein said wavelength tunable laser medium includes a Brewster-cut input surface.

9. The optically parametric oscillator according to claim 1, wherein said wavelength tunable laser medium includes a nonreflective coating and a vertical-incident cut input surface.

10. The optically parametric oscillator according to claim 2, wherein said wavelength tunable laser medium includes a nonreflective coating and a vertical-incident cut input surface.

11. A wavelength tunable laser system, comprising: an optically parametric laser oscillator including a first laser resonator composed of a first pair of opposed mirrors each having a prescribed reflectivity, a wavelength tunable laser medium disposed in said first laser resonator and capable of laser oscillation in a wavelength zone within a prescribed range, an excitation laser inputting exciting laser light to said wavelength tunable laser medium, an acousto-optical crystal disposed in said first laser resonator and to which is inputted the outgoing light from said wavelength tunable laser medium, and an acoustic wave inputting means mounted to said acousto-optical crystal and for inputting acoustic waves to said acousto-optical crystal;

a second resonator including a second pair of opposed mirrors each having a prescribed reflectivity;

a nonlinear crystal disposed in said second resonator and receiving excitation light from said optically parametric laser oscillator; and means for transmitting light from said optically parametric laser oscillator to said second resonator, wherein said second resonator outputs both signal light and idler light having different wavelengths each of which changes in response to a wavelength of the excitation light and a wavelength selection performed by said acousto-optical crystal.

12. The wavelength tunable laser system according to claim 11, further comprising:

a beam expander located in said first laser resonator between said wavelength tunable laser medium and said acousto-optical crystal, said beam expander expanding a beam diameter of light outputted from said wavelength tunable laser medium, said acousto-optical crystal receiving the beamexpanded light from said beam expander, wherein said beam expander reduces a per unit area power of light applied to said acousto-optical crystal thereby preventing damage to said acousto-optical crystal.

13. The wavelength tunable laser system according to claim 12, wherein said beam expander is a telescope.

14. The wavelength tunable laser system according to claim 11, wherein the first pair of opposed mirrors includes a total reflection mirror that is a specular coating on an input side of said wavelength tunable laser medium.

15. The wavelength tunable laser system according to claim 11, wherein said wavelength tunable laser medium includes a Brewster-cut input surface.

16. The wavelength tunable laser system according to claim 11, wherein said wavelength tunable laser medium includes a nonreflective coating and a vertical-incident cut input surface.

* * * * *